US 9,834,241 B2

United States Patent
Riha

(10) Patent No.: US 9,834,241 B2
(45) Date of Patent: Dec. 5, 2017

(54) REMOVABLE HAND CART DECK

(71) Applicant: Patrick H. Riha, Kansas City, MO (US)

(72) Inventor: Patrick H. Riha, Kansas City, MO (US)

( * ) Notice: Subject to any disclaimer, the term of this patent is extended or adjusted under 35 U.S.C. 154(b) by 0 days.

(21) Appl. No.: 15/043,910

(22) Filed: Feb. 15, 2016

(65) Prior Publication Data

US 2016/0236700 A1    Aug. 18, 2016

Related U.S. Application Data

(60) Provisional application No. 62/115,903, filed on Feb. 13, 2015.

(51) Int. Cl.
*B62B 3/02* (2006.01)
*B62B 1/00* (2006.01)

(52) U.S. Cl.
CPC .............. *B62B 3/02* (2013.01); *B62B 1/002* (2013.01)

(58) Field of Classification Search
CPC .... B62B 3/00; B62B 3/02; B62B 3/04; B62B 3/002; B62B 1/002
See application file for complete search history.

(56) References Cited

U.S. PATENT DOCUMENTS

| | | | | |
|---|---|---|---|---|
| 4,077,644 A * | 3/1978 | Roby | ......................... | B62B 3/00 280/47.34 |
| 4,458,906 A * | 7/1984 | Lamson | .................... | B62B 3/00 280/47.34 |
| 5,605,102 A * | 2/1997 | Simpson | .................. | A47F 10/04 108/51.3 |
| 5,704,624 A * | 1/1998 | Davis | ....................... | B62B 3/00 280/19 |
| 6,328,319 B1 * | 12/2001 | Stahler, Sr. | ............. | B62B 1/002 280/47.18 |
| 6,341,789 B1 * | 1/2002 | Checa | ..................... | B62B 1/264 280/47.28 |
| 6,394,470 B1 * | 5/2002 | Shirai | ..................... | B62B 3/184 280/33.996 |
| 6,685,200 B1 * | 2/2004 | Giannoni | .................. | B62B 3/02 108/57.16 |
| 8,459,515 B1 * | 6/2013 | Weis | ....................... | B62B 1/002 224/401 |
| 2003/0189303 A1 * | 10/2003 | Ciminelli | ............... | B62B 1/002 280/47.34 |
| 2013/0119623 A1 * | 5/2013 | Sadeh | ..................... | B62B 5/049 280/30 |

(Continued)

*Primary Examiner* — Brian L Swenson
(74) *Attorney, Agent, or Firm* — Polsinelli, PC

(57) ABSTRACT

A removable deck for a convertible hand truck need not be removed when the hand truck is converted between upright and recumbent positions. The deck includes a pair of guide slots separating a pair of lateral flanges from a central handle. The slots and central handle are configured to receive the handle of a hand truck when the truck is converted to a four-wheeled cart. The deck perimeter includes an upstanding lip positioned inboard of the slots, flanges and central handle portion. Sets of retaining strap guides secure the panel to the hand truck and tie-down apertures are provided for securing cargo to the deck. The guide slots and center handle cooperate to retain the hand truck handle in place when the hand truck is in its four-wheeled position without use of additional fasteners to prevent disengagement.

13 Claims, 2 Drawing Sheets

(56) References Cited

U.S. PATENT DOCUMENTS

2014/0183832 A1* 7/2014 Wang .................. B62B 3/022
  280/39
2016/0137011 A1* 5/2016 Kao .................... B60D 1/04
  280/412

* cited by examiner

REMOVABLE HAND CART DECK

CROSS REFERENCE TO RELATED APPLICATION

This application claims priority from U.S. Provisional Application Ser. No. 62/115,903 filed on Feb. 13, 2015, which is hereby incorporated by reference in its entirety.

FIELD OF INVENTION

The present disclosure relates to a platform attachment for use with a wheeled, hand-propelled vehicle, such as a hand cart. More particularly, it concerns a universal platform for use with convertible hand trucks, with a unique design in which the platform need not be removed to reconfigure a hand truck from a two-wheeled configuration into a four-wheeled cart.

BACKGROUND

Hand carts, dollies or hand trucks provide an efficient way for a single individual to move a heavy load by sliding it onto a flat ledge and using leverage to balance the load over a pair of wheels. This enables the load to be rolled, rather than lifted and carried, to a selected location. Hand trucks generally consist of an elongated open framework with wheels at the base and a transverse, flat toe plate. In the upright position, the toe plate rests on the floor and can be slid under the load and used to tip it backward onto the frame. The hand truck is rolled in a tipped position, with the load balanced between the toe plate and the open framework. The design of hand carts have been well-known and used within many different industries for the transportation of many diverse types of items.

While the open framework typically can accommodate loads that exceed the width of the frame side rails, smaller items and items having irregular shapes may slip through the open frame and loads of such items are not stable on the hand truck. Narrow items generally will not sit flat between the frame elements, causing them to tilt between the frame elements and become less stable as other items are stacked on top. Even items of mixed sizes may be difficult to transport. As additional items are stacked on top, the load becomes less stable. When the hand truck is tipped backwardly toward the operator, smaller items may fall through the frame. Items that are dislodged during transport cause a trip hazard and may result in shifting or collapse of the entire load with resulting damage to the freight and/or injury to the hand truck operator. Thus, hand trucks are not well-suited for transport of items of mixed sizes, particularly small or irregularly shaped items. For these reasons, it is not uncommon to observe a hand truck operator using one hand to steer the dolly while using the other hand to steady the load. Workers sometimes operate in pairs to transport an unstable load, so that one person can push and steer the hand truck while the other walks alongside to steady the load as needed. This decreases the efficiency of transportation since more than a single worker is required and the stability of the load overall can lead to items falling off during transportation.

In recent years, convertible hand trucks have been developed which are adjustably positionable between an upright configuration supported on two wheels, and a recumbent, cart-like configuration in which the frame is supported by four wheels. If equipped with a solid load bearing surface, such convertible hand trucks could be used in either their upright or recumbent configuration to carry quantities of smaller items that might otherwise escape through an open frame. Use of a solid bearing surface also allows items to be more evenly distributed over the surface, making the load more stable and easier to transport.

While hand trucks with permanently attached platforms are available, they are heavier than the open frame models, more cumbersome to transport, and substantially more expensive. In order to obtain a detachable hand truck platform, many users have constructed their own platforms or decks which are fastened to the frame by various types of fasteners. Such homemade platforms are generally constructed of plywood and are heavy, ill-fitting, unsightly, cumbersome to install and remove, and are limited to use on the particular hand truck for which they were designed. In addition, when used with convertible hand trucks, they must be removed and reinstalled each time the platform is reconfigured. This decreases the overall effectiveness of the product and limits its general ease of use. Few commercial platform accessories have been developed for use with hand trucks. Although presenting a more polished appearance, these platforms are substantially less economical and are designed for use with particular hand trucks made by the same manufacturer and are not interchangeable for configuration or use on other hand trucks. Because the commercial platforms are designed for a only a single hand truck these accessories are generally not compatible with hand trucks of a different type even obtained from the same manufacturer, or with hand trucks obtained from different manufacturers.

Convertible hand trucks present a particular problem, because a deck structure is generally most needed when the truck frame is in a lowered or recumbent position, with all four wheels engaging the ground to form a cart-like structure. However, a deck may interfere with the ability to position an upright hand truck to its recumbent position, or to reposition the hand truck to its upright position. This may be exacerbated by a deck fastening system, which is generally tailored to a particular hand cart. The inconvenience associated with removal and reinstallation of the deck each time the hand truck must be reconfigured effectively limits the utility and versatility of the hand truck.

Thus, there is a need for a universal platform or deck that can be used on hand trucks available from a wide variety of manufacturers, that can be easily installed and removed by a user without the need for tools and fasteners, and that can be installed on convertible hand trucks and remain in place when such hand trucks are adjustably positioned between an upright and a recumbent position to form either a two-wheeled device or a four-wheeled cart.

SUMMARY

The present disclosure provides a greatly improved removable platform or deck attachment for use with a convertible hand cart or truck. The deck is lightweight and easy to install on a hand truck or hand cart (both terms are interchangeable throughout the document) when it is in either an upright or recumbent position, and can be allowed to remain in place when the hand truck is adjustably positioned to define either a two-wheeled hand truck or a four-wheeled cart. The deck attachment may be easily and quickly removed and reinstalled and may be used on a wide variety of hand trucks.

The deck attachment includes a generally rectangular panel having a pair of guide slots at one end separating a pair of lateral flanges from a central portion. The width and length of the panel can vary dependent on the size of the hand chart. The guide slots are sized for reception of a hand truck handle that may be removed from the frame and reattached to the hand truck in its recumbent position. The guide slots are also sized for reception of a hand truck handle that slides through a pivoting sleeve assembly into an orthogonal position as the cart frame lowers to a recumbent position. The central portion between the guide slots is apertured to form a handle, and may also serve as a hanger for the deck attachment when it is not in use. In another aspect, the central portion between the guide slots is not apertured, but instead includes an indent or groove on the normally back or lower surface for providing a handgrip and engaging a hook. The panel includes one or more pairs of spaced apart sets of apertures for receiving a retaining strap or band that is used to secure the panel to the hand truck. The panel also includes one or more pairs of spaced apart apertures for receiving tie-down straps or bands that may be used for securing the load to the deck.

In one aspect an upstanding edge or lip extends around the perimeter of the panel. At the forward end, the lip is positioned inboard of the slots, flanges and central handle portion. In another aspect, the upstanding lip forms a low sidewall. In another aspect, the upstanding lip is extended in height to form a more robust sidewall defining a bed for receiving and retaining objects without the need for retaining straps or bands.

Various objects, features and advantages of this disclosure will become apparent from the following detailed description, which, taken in conjunction with the accompanying drawings, which depict, by way of illustration and example, certain embodiments of this removable hand cart deck attachment.

The drawings constitute a part of this specification, include exemplary embodiments of the disclosure, and illustrate various objects and features thereof.

DETAILED DESCRIPTION

Figure 1:
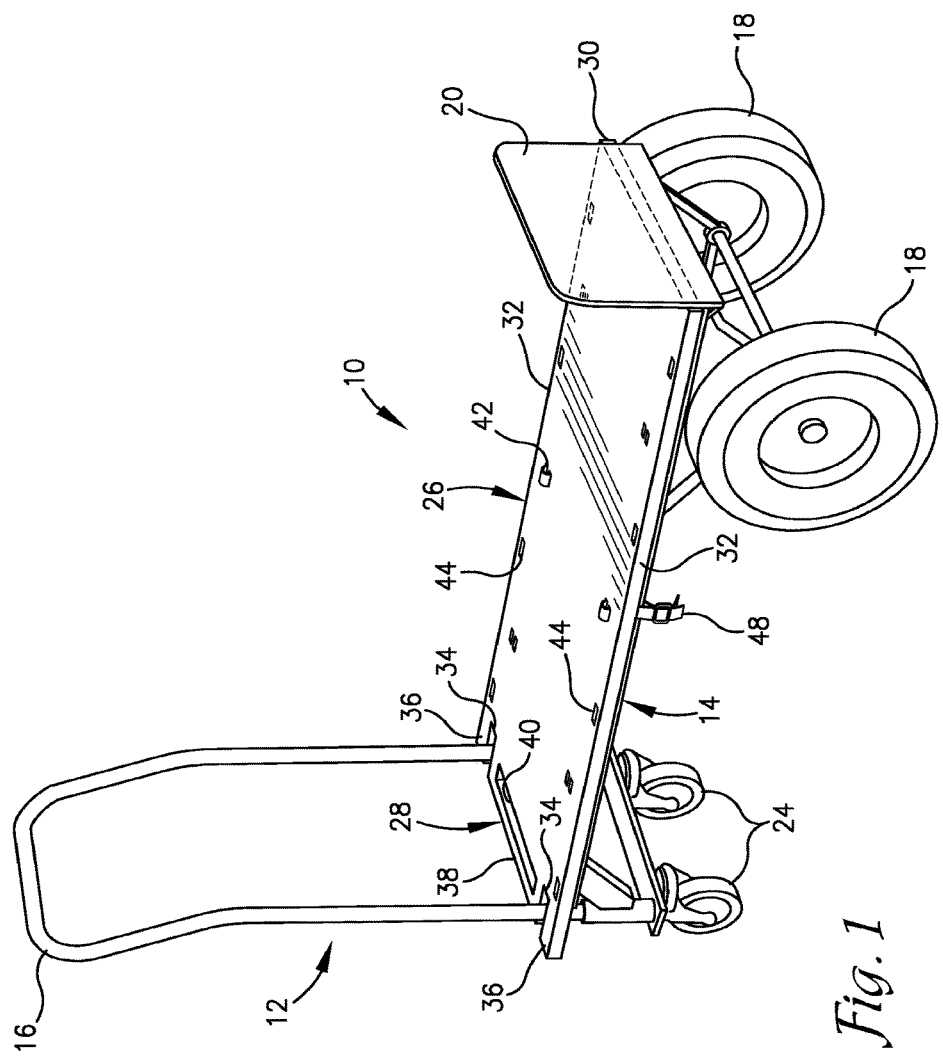
FIG. 1 is a perspective view of a removable hand cart deck attachment in accordance with the disclosure shown in association with an exemplary hand truck in a recumbent position.

A removable hand cart or hand truck deck constructed according to the present disclosure is generally designated by the reference numeral 10 and is shown in FIG. 1 in an exemplary installation on one type of convertible hand cart or hand truck 12. The hand truck is depicted in a recumbent position with four ground-engaging wheels. The removeable deck is designed to provide a solid surface for use on a hand truck that allows for the distribution of the load. The solid surface of the removeable deck can provide substantially more surface area and therefore an increase in load bearing surface providing for 20× or more area and therefore creating a safer and more stable load support surface. The additional of the increased surface area is important to aide in the transport of items and therefore reduce potential movement or slipping for various loads of various sizes. The hand truck 12 includes an elongated, generally open frame 14, having a head or top end, a base or bottom end and a pair of laterally spaced apart side rails. The handle 16 is of loop-type construction, or alternatively it may include a pair of handle grips. The handle 16 includes a pair of elongated legs, the free ends of which are telescopically received within respective tubular side rails that are open at the head end of the frame 14. As shown in FIG. 1, the upper portion of the handle 16 may be inclined toward the user in a "flow back" position to facilitate grasping with one or two hands when a user is directing the cart. Axle brackets are fixed to the base ends of the side rails of the frame for connecting an axle and a pair of axle-mounted primary support wheels 18 to the base end of the frame. A nose plate or toe plate 20 is also connected at the base end of the frame 14. Axle brackets are fixed to the head ends of the side rails for connecting a pair of tubular couplings or sleeves that telescopically receive the free ends of the handle legs when the hand truck is in a recumbent position. The lower ends of the couplings connect an axle and a pair of axle-mounted caster-type secondary support wheels 24 to the head end of the frame 14. The hand truck configuration allows for the shifting from a two wheel configuration to a four wheel configuration as are currently found on many hand trucks within the industry.

As best shown in FIG. 1, the deck attachment 10 includes a panel 26 having a first or head end 28, a second or base end 30, and a pair of opposed sides 32. The head end includes a pair of spaced apart elongated apertures or handle guide slots 34. The handle guide slots 34 divide the head end of the deck panel into a pair of outboard flanges 36 and a center portion 38. The center portion includes an aperture 40 that forms a handle. The aperture 40 may also be used to hang the deck attachment when it is disengaged from the hand truck 12 and not in use. In one aspect, an indent or groove may be substituted for the aperture 40. In such an aspect the indent or groove is also configured for use to hang the deck attachment.

In one embodiment the handle guide slots are configured to be spaced from the sides 32 with the outboard flanges 36 being a width of 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12 inches. The spacing of the outboard flanges allows for the hand truck handle 16 to fit within the handle guide slots 34. This configuration allows for the deck panel to be stabilized by the hand truck handle that is configured to fit within the handle guide slots 34. Intermediate the handle guide slots are the center portion 38 that can be any dimensional width that allows for the center portion 38 to create the center portion. In another embodiment the center portion can be a space and not include a center portion, but instead create an opening between the outboard flanges 36. This open center configuration will still allow for the hand truck handle 16 to fit between the outboard flanges 36. The configuration of the deck panel creates the unique outboard flanges that are positioned to extend past the hand truck handle to minimize movement of the deck panel when in use on the hand truck.

The deck panel 26 has a generally planar, rectangular shape generally corresponding to the frame of a hand truck. The configuration of the shape allows for the deck panel to communicate with the hand truck's frame design, that is typically of tubular members, to allow for the placement of the panel deck to allow to haul load when in use. It is foreseen, however, that the deck could have any other suitable generally planar shape, such as a square or other quadrilateral, or that it may be flared or extended laterally, either overall or in a particular portion, such as a T-shape at the base. The panel can vary in width and length dependent on the use with the desired hand cart. Additionally, the deck panel 26 width can be configured to extend over the wheels to create a surface that ensures the panel is between the load and the wheels. The extension of the deck panel past the plane of the wheels adds to stability and safety when transporting the load. The handle guide slots are sized and spaced to accommodate the extended handle of a convertible hand truck when it is converted from a two-wheeled to a four-wheeled configuration. The deck panel is preferably formed of a sturdy, lightweight material such as a synthetic resin, composite wood material, aluminum or other light weight metal, although any other suitable material may be employed.

The deck panel 26 includes pairs of spaced apertures or guides 42 for threaded reception of retaining straps or bands, which are used to encircle the frame 14 of the hand truck 12 and attach it to the deck 10. As shown in FIG. 1, two guides are provided in spaced relation to each of the panel sides 32 to form a set. Three sets of apertures are employed at spaced intervals along the length of the deck panel 26 to enable a user to select the guides that best fit the frame of the particular hand truck. In other aspects, one, two, three, four, five, or any number of sets of apertures may be provided.

The deck panel is also provided with a plurality of tie-down apertures 44 for receiving tie-down straps, ratchet straps, cords, such as bungee cords, or ropes. The tie-down apertures are positioned at intervals in spaced relation to each side 32 of the deck. Although the tie-down apertures 44 are depicted in side-to-side alignment, this is not required and in other aspects, the apertures adjacent one side of the deck panel 26 may be longitudinally offset from the apertures adjacent the opposite side of the panel.

Figure 2:
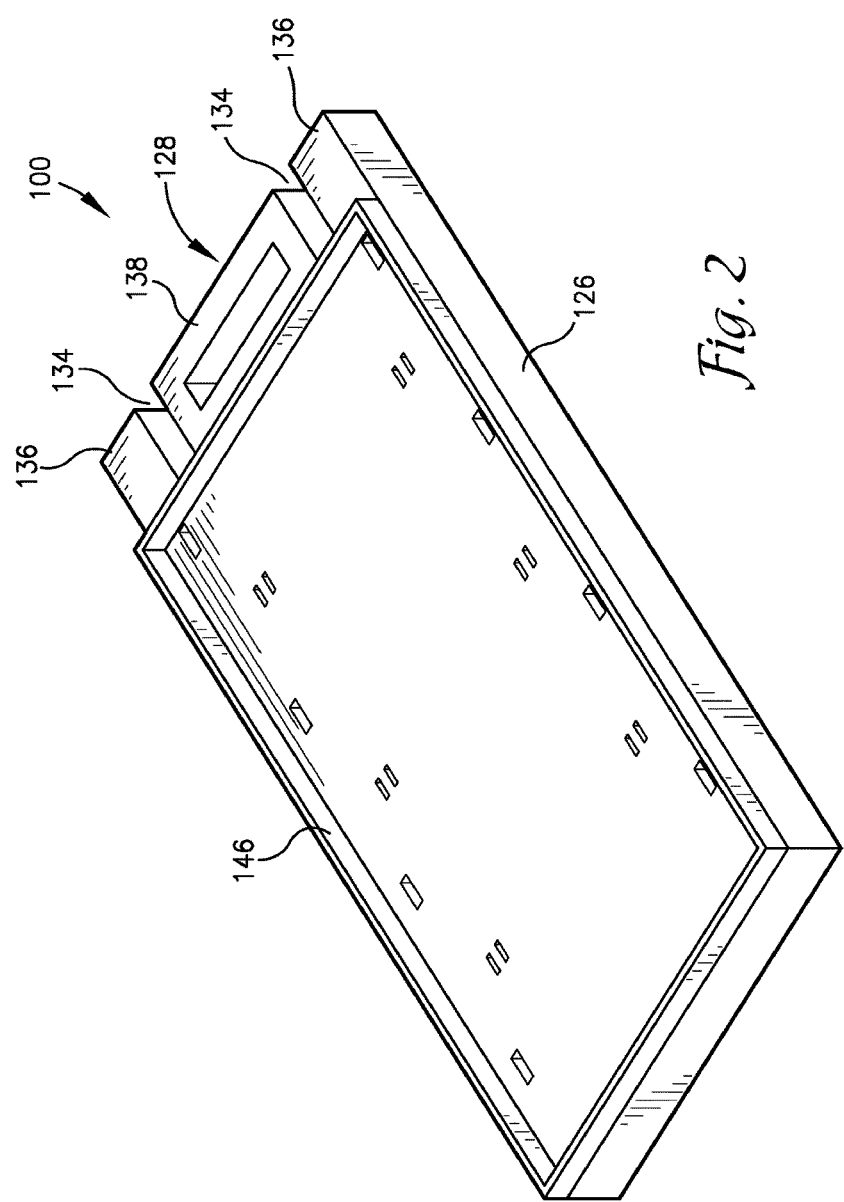
FIG. 2 is a perspective view of an alternate embodiment of the deck attachment having an upstanding lip.

In another aspect shown in FIG. 2, a deck attachment 100 is of construction similar to that previously described except that the panel 126 includes an upstanding edge or lip 146 which is configured to extend around the perimeter of the load bearing portion of the panel 126. The portion of the lip at the head end 128 of the panel 126 is positioned inboard of the slots 134, flanges 136 and central handle portion 138. In this manner, the lip imparts a tray-like overall appearance to the panel. In another aspect, the lip 146 may project farther upwardly than shown in FIG. 1, thereby forming a low sidewall. In still another aspect, the lip 146 may extend substantially upwardly thereby forming a higher sidewall which may assist in retaining the cargo against lateral displacement without the need for straps or bands. The lip 146 or sidewall can be of any configuration on the upper surface of the deck including in a perpendicular configuration around the circumference of the panel, in a circumference following the body of the panel not extending to the outboard flanges 136 or center handle portion 138. In an additional embodiment the panel can include a plurality of sidewalls configured with dimensions that are defined based on the consumers transportation desires.

In use, the deck attachment 10 is installed on a hand truck 12 by threading a retaining strap 48 through each of two selected sets of retaining strap guides 42. Because three sets of apertures are provided, the user may select one or two sets of strap guides that best fit the frame of the particular hand truck in use. In another embodiment the deck attachment may include other means known in the industry to aide in attaching the deck to the hand truck, such as integrated hood and loop attachment, integrated apertures on the back side of the deck that allows for universal connection on a hand truck. The deck may be installed on a hand truck 12 when it is positioned in either a standing or upright position, with two ground-engaging wheels, or when the hand truck is positioned in a recumbent position to form a cart having four ground-engaging wheels. The deck attachment then creates a surface area on the hand cart that extends form the nose plate to the handle with a width that extends past the plane of the wheels. Those skilled in the art will appreciate that any number of strap guides 42 may be employed and that each individual strap guide 42 may include one, two, three, or any suitable number of strap-receiving apertures.

To install the deck 10 on a hand truck in its upright position, a user positions the second or base end 30 of the deck panel 26 on the hand truck nose plate 20 and against the frame 14. The user grasps the retaining straps that have been threaded through the panel guide sets 42 and extends them behind the hand truck frame 14 in encircling fashion. The user next ties or ratchets the strap ends, or attaches them by hook and loop or any other suitable fasteners that may be provided on the straps to shorten the straps and snug the panel 26 against the frame 14.

Once installed, the deck attachment 10 need not be removed prior to conversion of the hand truck from an upright to a recumbent position. The unique nature of the deck allows for ease of use by a user while still allowing full operation of the hand truck in either the upright or recumbent position. To convert the upright hand truck to a recumbent cart-like position as shown in FIG. 1, a user tips the hand truck 12 to lower the frame to a recumbent position in which both the primary wheels 18 and the secondary wheels 24 engage a support surface, such as the ground. The user then grasps and pulls the handle 16 away from the body of the hand truck 12 and in the plane of the side rails. This causes the handle legs to slide out from within the tubular side rails of the frame 14 until the handle 16 is disengaged from the frame 14. The user then inserts the free ends of the legs through the deck slots 34 and into the couplings surmounting the secondary caster wheels 24. In this manner, the handle 16 is repositioned orthogonal to the deck attachment 10. The handle legs may be secured in place in the respective couplings using cotter pins or any other suitable fasteners.

Advantageously, the deck attachment 10 may be used in association with a wide variety of convertible hand trucks 12, including hand trucks constructed to include a handle mounted to the head of the frame 14 by a pair of pivot linkages. Conversion of such hand trucks from a generally vertical position to a recumbent position involves shifting the handle into orthogonal relation to the frame 14 while tipping the hand truck to lower the frame to the ground. As the handle is shifted into orthogonal relation to the frame 14, the legs of the handle are slidingly received within the respective deck guide slots 34. The guide slots 34 of the deck attachment 10 are sized and configured so that the legs of the handle may be inserted and removed through the slots 34 and in orthogonal relation to the deck 10 as previously described. The slots 34 are also sized and configured so that the handle may also be inserted and removed by traveling in sliding relation along the length of the slots 34 as the handle is moved in an arc of about 90° from a position parallel to the deck to a position orthogonal to the deck 10 or from a position orthogonal to the deck to a position parallel to the deck.

Where the deck attachment 10 has been installed on a hand truck in a recumbent position, it need not be removed prior to conversion of the hand truck to an upright position, which is accomplished by reversal of the preceding steps.

Whether the hand truck 12 is in an upright or recumbent position, a user may remove the deck 10 from the hand truck by releasing the straps and grasping the handle 38 to lift it away from the frame 14. The user may then store the deck until it is needed by suspending it from the handle aperture 40. In another embodiment the deck may include a means for easy of storage such as a strap or other aperture that allows for hanging on a wall on a hook.

The deck flanges 36, guide slots 34, and center handle portion 38 are configured and sized for sliding reception of the legs of the extended handle during conversion of the hand truck and for retention of the legs after conversion without allowing for excessive play. This prevents the deck attachment 10 from shifting from side to side or from becoming disengaged from the frame when the hand truck 12 is in the four-wheeled hand cart configuration. In this manner, the deck flanges 36, slots 34, and center portion 38 cooperate to effectively retain the handle 16 without the need for additional fasteners, thus preventing lateral sliding and/or disengagement of the deck 10 even when the straps have not been employed to attach the deck 10 to the frame 14.

As required, detailed embodiments of the removable hand cart deck attachment have been disclosed. However, it should be apparent to those skilled in the art that the disclosed embodiments are provided for illustration only and are merely exemplary of the device, which may be embodied in various forms. Therefore, specific structural and functional details disclosed herein are not to be interpreted as limiting, but merely as a basis for the claims and as a representative basis for teaching one skilled in the art to variously employ the deck in virtually any appropriately detailed structure.

I claim:

1. A platform for use with a convertible hand cart, the hand cart adjustably positionable between upright and recumbent positions to define either a two-wheeled or a four-wheeled support frame, the hand cart comprising a frame having a head end, a base end and a pair of spaced apart side rails, a toe plate connected to the base end, a pair of primary support wheels connected to the base end, a pair of secondary support wheels positionable to support the head end, an elongated handle including a pair of legs interconnected at one end, the handle and legs disengageable from a position parallel to the side rails to a position transverse to the side rails to support the frame in a horizontal position, the platform comprising:
   a. a panel having a first end, a second end, and a pair of opposed sides;
   b. the first end including a pair of spaced apart guide slots for receiving the legs of a hand truck handle when the handle is positioned transverse to the side rails, wherein the guide slots are configured to allow the legs of the handle to move in an arc between a position parallel to the platform and a position orthogonal to the platform;
   c. a plurality of apertures positioned in laterally spaced relation on the panel;
   d. the apertures configured to receive a strap passed therethrough from an upper surface of the panel to engage the side rails of the hand cart frame against a lower surface of the panel; and
   e. the second end comprising a straight edge wherein the second end is configured to be installed by positioning the second end of the panel on the toe plate such that when the hand truck is in an upright position, the toe plate is in contact with the ground.

2. The platform as set forth in claim 1, the guide slots defining a central area therebetween.

3. The platform as set forth in claim 2, the guide slots further defining a pair of lateral flanges, the lateral flanges, the guide slots and the central area therebetween configured to receive and retain the hand cart handle legs when the hand cart is converted to a four-wheeled support frame.

4. The platform as set forth in claim 3, wherein the platform further includes an upstanding perimeter lip extending around the second end and opposed sides and inboard of the guide slots, the lateral flanges, and platform handle.

5. The platform as set forth in claim 3, wherein the central area is apertured to form a handle.

6. The platform as set forth in claim 1, further including a plurality of apertures for receiving cargo restraining ties.

7. A platform for use with a convertible hand cart, the hand cart adjustably positionable between upright and recumbent positions to define either a two-wheeled or a four-wheeled support frame, the hand cart comprising a frame having a head end, a base end and a pair of spaced apart side rails, a toe plate connected to the base end, a pair of primary support wheels connected to the base end, a pair of secondary support wheels positionable to support the head end, an elongated handle including a pair of legs connected at one end, the handle and legs disengageable from a position parallel to the side rails to a position transverse to the side rails to support the frame in a horizontal position, the platform comprising:
   a. a panel having a first end, a second end, and a pair of opposed sides;
   b. the first end including a pair of spaced apart guide slots for receiving the legs of a hand truck handle as the handle is pivoted to a position transverse to the side rails;
   c. the guide slots defining a central area therebetween;
   d. the central area including an aperture forming a handle;
   e. the guide slots defining a pair of lateral flanges;
   f. an upstanding perimeter lip extending around the panel second end and opposed sides and inboard of the guide slots, flanges, and handle;
   g. a first plurality of apertures positioned in laterally spaced relation on the panel and configured to receive a strap passed therethrough from an upper surface of the panel to engage the side rails of the hand cart frame against a lower surface of the panel;
   h. the panel including a second plurality of apertures configured for receiving cargo restraining ties;
   i. the lateral flanges, the guide slots and the central area therebetween configured to receive and retain the handle legs when the hand cart is converted to a four-wheeled support frame, wherein the guide slots are configured to allow the legs of the handle to move in an arc between a position parallel to the platform and a position orthogonal to the platform; and
   j. the second end including a straight edge wherein the second end is configured to be installed by positioning the second end of the panel on the toe plate such that when the hand truck is in an upright position, the toe plate is in contact with the ground.

8. A platform for use with a convertible hand cart, the platform comprising:
   a. a panel having a first end, a second end, and a pair of opposed sides;
   b. the first end including a pair of spaced apart outboard flanges;
   c. a center portion intermediate the pair of outboard flanges, wherein the pair of outboard flanges and the center portion form a pair of guide slots, the guide slots are configured to allow the legs of a handle to move in an arc between a position parallel to the platform and a position orthogonal to the platform;
   d. a plurality of apertures positioned in laterally spaced relation on the panel;

e. the apertures configured to receive a strap passed therethrough from an upper surface of the panel to engage the hand cart frame against a lower surface of the panel f. wherein the second end is configured such that when installed on a hand cart in an upright position, a toe plate of the hand cart is in contact with the ground.

9. The platform as set forth in claim 8, wherein the platform further includes a pair of handle guide slots for receiving the legs of a hand cart handle when the handle is positioned transverse to the side rails, within the center portion between the pair of outboard flanges.

10. The platform as set forth in claim 9, wherein the center portion includes a handle aperture.

11. The platform as set forth in claim 8, wherein the outboard flanges are a projection from the body of the deck at the first end at the opposed sides and the width of the outboard flanges are between 0.5 inches and 12 inches.

12. The platform as set forth in claim 8, wherein the upper surface of the panel includes a perimeter sidewall that extends perpendicular from the upper circumference of the upper body of the platform.

13. The platform as set forth in claim 8, wherein the panel including a second plurality of apertures configured for receiving cargo restraining ties.

\* \* \* \* \*